(12) United States Patent
Lim et al.

(10) Patent No.: US 12,542,238 B2
(45) Date of Patent: Feb. 3, 2026

(54) MULTILAYER ELECTRONIC COMPONENT

(71) Applicant: SAMSUNG ELECTRO-MECHANICS CO., LTD., Suwon-si (KR)

(72) Inventors: Yong Jun Lim, Suwon-si (KR); Bae Soon Son, Suwon-si (KR); Sung Hyung Kang, Suwon-si (KR); Kyung Ho Lee, Suwon-si (KR); Se Na Bae, Suwon-si (KR); Hye Jin Jin, Suwon-si (KR); Sang Eon Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 114 days.

(21) Appl. No.: 18/431,063

(22) Filed: Feb. 2, 2024

(65) Prior Publication Data

US 2024/0355544 A1     Oct. 24, 2024

(30) Foreign Application Priority Data

Apr. 19, 2023  (KR) .................. 10-2023-0051569
Sep. 7, 2023   (KR) .................. 10-2023-0118903

(51) Int. Cl.
*H01G 4/30*     (2006.01)
*C04B 35/49*    (2006.01)
(Continued)

(52) U.S. Cl.
CPC ........... *H01G 4/1209* (2013.01); *C04B 35/49* (2013.01); *C04B 37/001* (2013.01); *H01G 4/30* (2013.01);
(Continued)

(58) Field of Classification Search
None
See application file for complete search history.

(56) References Cited

U.S. PATENT DOCUMENTS 10,832,867 B2   11/2020  Choi et al.
2002/0171066 A1 11/2002  Venigalla et al.
(Continued)

FOREIGN PATENT DOCUMENTS

JP   2008-239402 A   10/2008
JP   2021-077678 A    5/2021
(Continued)

OTHER PUBLICATIONS

European Search Report dated Jan. 29, 2025 issued in the corresponding European Patent Application No. 24156710.6.

*Primary Examiner* — Timothy J. Dole
*Assistant Examiner* — Esther N Lian
(74) *Attorney, Agent, or Firm* — Morgan, Lewis & Bockius LLP

(57) ABSTRACT

A body including a dielectric layer and internal electrodes disposed alternately with the dielectric layer interposed therebetween; and external electrodes disposed on the body, wherein the dielectric layer includes a main component containing calcium (Ca), strontium (Sr), zirconium (Zr) and titanium (Ti) and a sub-component containing manganese (Mn), yttrium (Y) and silicon (Si), wherein the dielectric layer includes a plurality of dielectric grains and grain boundaries disposed between adjacent dielectric grains, and at least a portion of the plurality of dielectric grains has a core-shell structure, a content of yttrium (Y) included in a core relative to 100 moles of zirconium (Zr) included in the core and a shell is defined as Yc, a content of yttrium (Y) included in the shell relative to 100 moles of zirconium (Zr) included in the core and the shell is defined as Ys, and Ys/Yc>9 is satisfied.

10 Claims, 7 Drawing Sheets

(51) Int. Cl.
  *C04B 37/00* (2006.01)
  *H01G 4/12* (2006.01)
(52) U.S. Cl.
  CPC ............. *C04B 2235/3225* (2013.01); *C04B 2235/3236* (2013.01); *C04B 2235/3249* (2013.01); *C04B 2235/3262* (2013.01); *C04B 2235/3418* (2013.01); *C04B 2235/785* (2013.01); *C04B 2235/87* (2013.01); *C04B 2237/348* (2013.01); *C04B 2237/68* (2013.01)

(56) References Cited

U.S. PATENT DOCUMENTS

| | | | |
|---|---|---|---|
| 2004/0038800 A1 | 2/2004 | Horie et al. | |
| 2011/0194228 A1* | 8/2011 | Ishihara | C04B 35/4682 501/137 |
| 2012/0050941 A1* | 3/2012 | Murakawa | C04B 35/4682 361/321.1 |
| 2012/0162858 A1* | 6/2012 | Tanaka | H01G 4/1227 361/321.4 |
| 2015/0364259 A1* | 12/2015 | Kanzaki | C04B 35/4682 361/301.4 |
| 2019/0066920 A1* | 2/2019 | Kim | C04B 35/4682 |
| 2019/0135701 A1* | 5/2019 | Yun | H01G 4/1236 |
| 2020/0043658 A1* | 2/2020 | Choi | H01G 4/232 |
| 2021/0134527 A1 | 5/2021 | Ogawa et al. | |
| 2021/0249192 A1* | 8/2021 | Kang | C04B 35/62894 |
| 2022/0028611 A1* | 1/2022 | Iguchi | H01G 4/30 |
| 2022/0177371 A1* | 6/2022 | Chung | H01G 4/248 |
| 2022/0254568 A1* | 8/2022 | Murakami | C04B 35/49 |
| 2023/0046855 A1 | 2/2023 | Inomata | |

FOREIGN PATENT DOCUMENTS

| | | |
|---|---|---|
| JP | 2023-021929 A | 2/2023 |
| KR | 10-2003-0061699 A | 7/2003 |

* cited by examiner

MULTILAYER ELECTRONIC COMPONENT

CROSS-REFERENCE TO RELATED APPLICATION(S)

This application claims benefit of priority to Korean Patent Application No. 10-2023-0118903 filed on Sep. 7, 2023 and Korean Patent Application No. 10-2023-0051569 filed on Apr. 19, 2023 in the Korean Intellectual Property Office, the disclosures of which are incorporated herein by reference in their entirety.

BACKGROUND

1. Field

The present disclosure relates to a multilayer electronic component.

2. Description of Related Art

A multilayer ceramic capacitor (MLCC), a multilayer electronic component, may be a chip-type condenser mounted on a printed circuit board of various electronic products such as a liquid crystal display (LCD) and a plasma display panel (PDP), a computer, a smartphone, an infotainment system, an automobile system and charging or discharging electricity.

Depending on required characteristics, a multilayer ceramic capacitor may be classified as a temperature compensated Class I type using $CaZrO_3$-based paraelectric $(Ca_{1-x}Sr_x)(Zr_{1-y}Ti_y)O_3$ (CSZT, $0 \leq x \leq 0.5$, $0 \leq y \leq 0.5$)) as the main component of a dielectric layer, and a Class II having high-K characteristics by using ferroelectric $BaTiO_3$(BT) having a crystal structure as a main component of a dielectric layer.

As an electronic product has been designed to have a reduced and slimmer size, and more functionality, a chip component has also been required to have a smaller size, and the mounting of electronic components has also been highly integrated. Also, when an electronic product are applied to an automobile system, the electronic product may be exposed to high heat and vibrations, such that higher reliability may be required.

As such, it may be necessary to improve electrical properties and reliability of a multilayer ceramic capacitor suitable for various purposes.

SUMMARY

Some example embodiments of the present disclosure may improve dielectric properties of a multilayer electronic component including CSZT as a main component of a dielectric layer.

Some example embodiments of the present disclosure may improve reliability, such as withstand voltage properties and temperature-capacitance properties, of a multilayer electronic component including CSZT as a main component of a dielectric layer.

According to some example embodiments of the present disclosure, a body including a dielectric layer and internal electrodes disposed alternately with the dielectric layer interposed therebetween; and external electrodes disposed on the body, wherein the dielectric layer includes a main component containing calcium (Ca), strontium (Sr), zirconium (Zr) and titanium (Ti) and a sub-component containing manganese (Mn), yttrium (Y) and silicon (Si), wherein the dielectric layer includes a plurality of dielectric grains and grain boundaries disposed between adjacent dielectric grains, and at least a portion of the plurality of dielectric grains has a core-shell structure, and wherein, when, in the core-shell structure, a content of yttrium (Y) included in a core relative to 100 moles of zirconium (Zr) included in the core and a shell is defined as Yc, and a content of yttrium (Y) included in the shell relative to 100 moles of zirconium (Zr) included in the core and the shell is defined as Ys, Ys/Yc>9 is satisfied.

BRIEF DESCRIPTION OF DRAWINGS

The above and other aspects, features, and advantages of the present disclosure will be more clearly understood from the following detailed description, taken in combination with the accompanying drawings, in which.

DETAILED DESCRIPTION

Figure 1:
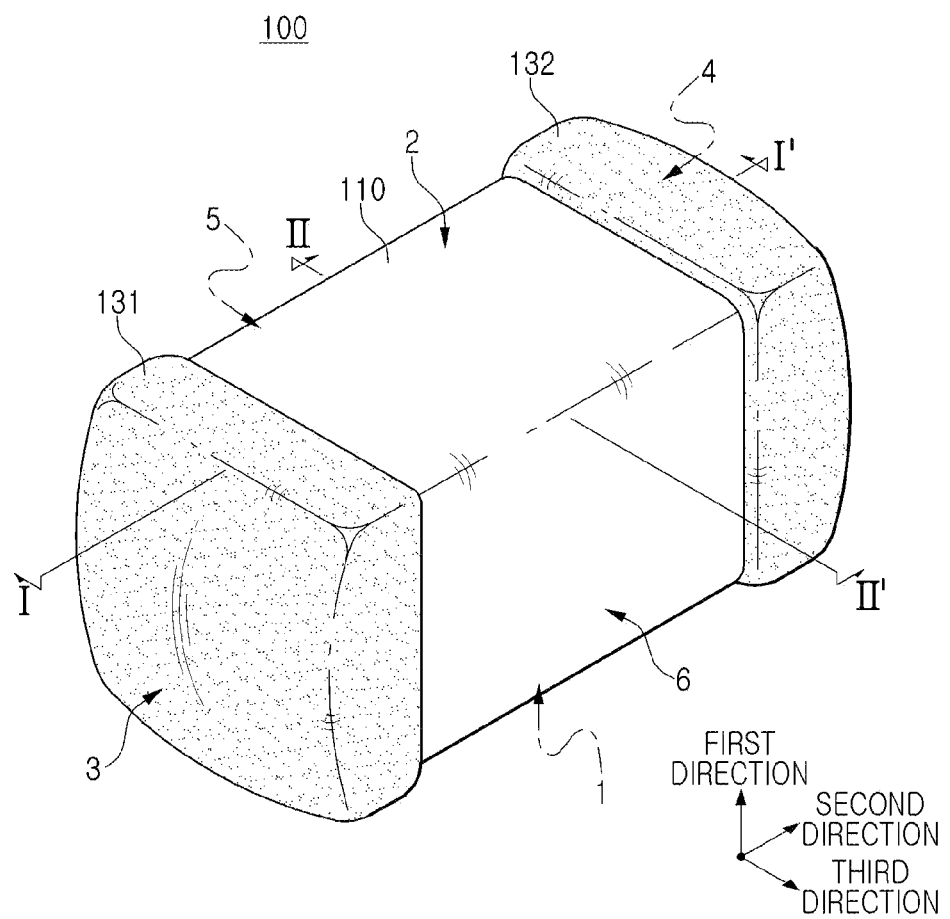
FIG. 1 is a perspective diagram illustrating a multilayer electronic component according to an example embodiment of the present disclosure.

Hereinafter, embodiments of the present disclosure will be described below with reference to the accompanying drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after a gaining an understanding of the disclosure of this application.

In the drawings, same elements will be indicated by the same reference numerals. Also, redundant descriptions and detailed descriptions of known functions and elements which may unnecessarily render the gist of the present disclosure obscure will not be provided. In the accompanying drawings, some elements may be exaggerated, omitted or briefly illustrated, and the sizes of the elements may not necessarily reflect the actual sizes of these elements. The terms, "include," "comprise," "is configured to," or the like of the description are used to indicate the presence of features, numbers, steps, operations, elements, portions or combination thereof, and may not exclude the possibilities of combination or addition of one or more features, numbers, steps, operations, elements, portions or combination thereof.

In the drawings, a first direction may be defined as a direction in which first and second internal electrodes are alternately disposed with a dielectric layer interposed therebetween or a thickness T direction, among second and third directions perpendicular to the first direction, a second direction may be defined as a length L direction, and a third direction may be defined as a width W direction.

FIG. 1 is a perspective diagram illustrating a multilayer electronic component according to some example embodiments of the present disclosure.

Figure 2:
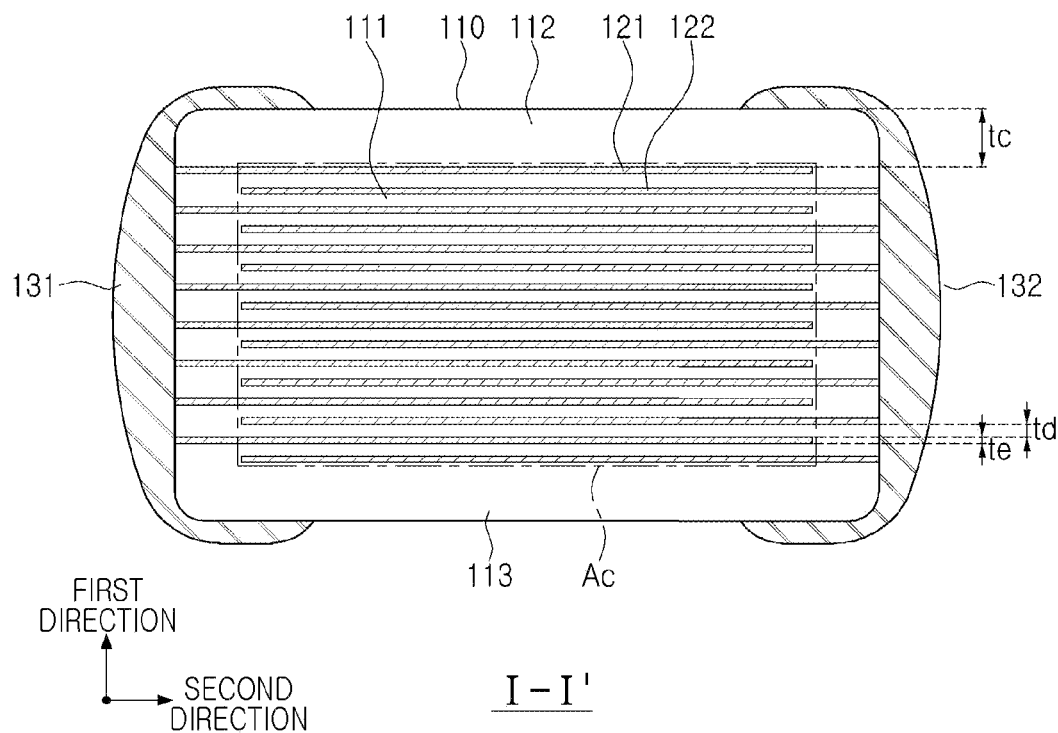
FIG. 2 is a cross-sectional diagram taken along line I-I' in FIG. 1.

FIG. 2 is a cross-sectional diagram taken along line I-I' in FIG. 1.

Figure 3:
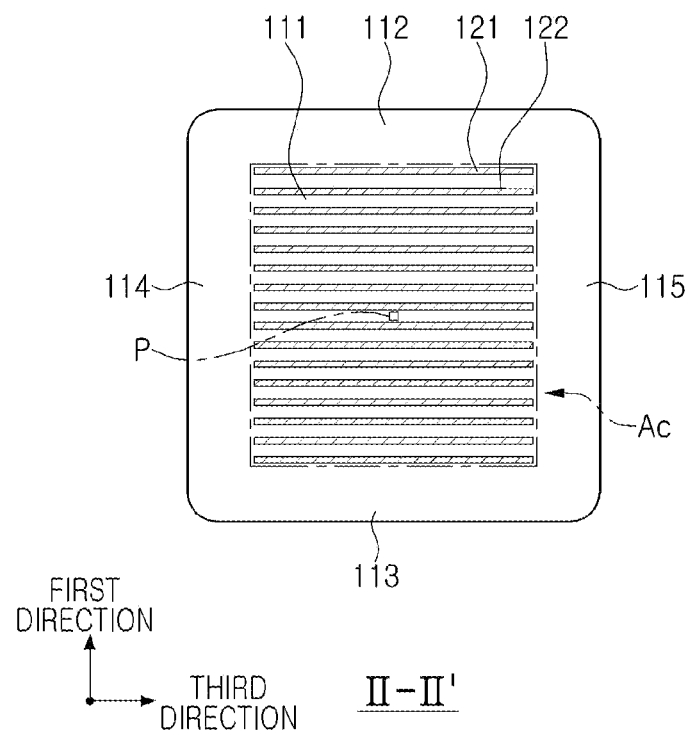
FIG. 3 is a cross-sectional diagram taken along line II-II' in FIG. 1.

FIG. 3 is a cross-sectional diagram taken along line II-II' in FIG. 1.

Figure 4:
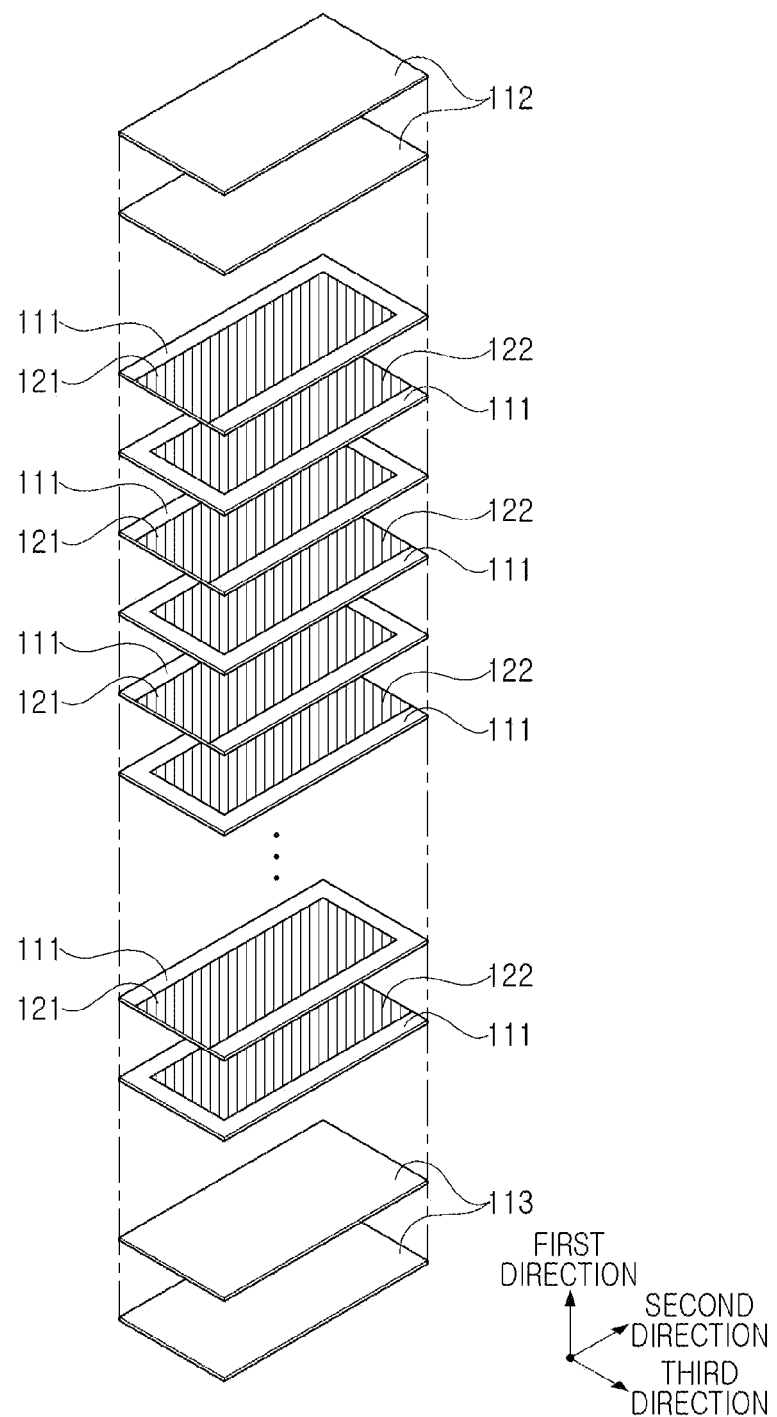
FIG. 4 is an exploded perspective diagram illustrating a structure in which an internal electrode, a dielectric layer, and a cover portion are disposed.

FIG. 4 is an exploded perspective diagram illustrating a structure in which an internal electrode, a dielectric layer, and a cover portion are disposed.

Figure 5:
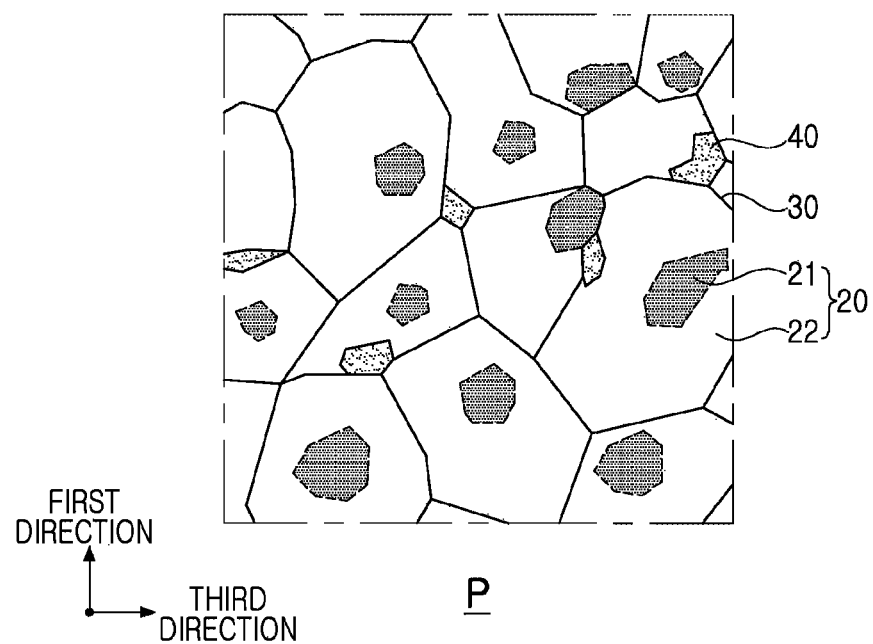
FIG. 5 is an enlarged diagram illustrating region P in FIG. 3.

FIG. 5 is an enlarged diagram illustrating region P in FIG. 3.

Figure 6A:
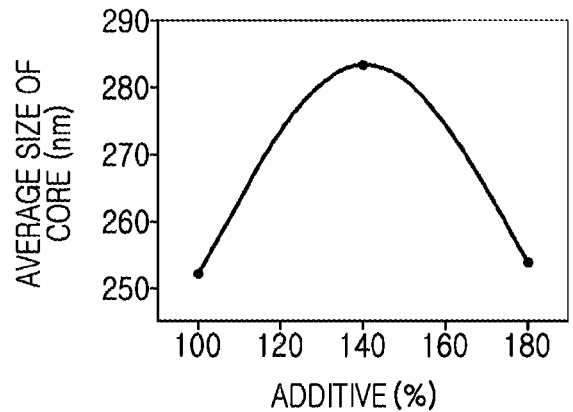
FIGS. 6A, 6B and 6C are graphs illustrating changes in average core-shell size depending on contents of additive according to an example embodiment of the present disclosure.
Figure 6B:
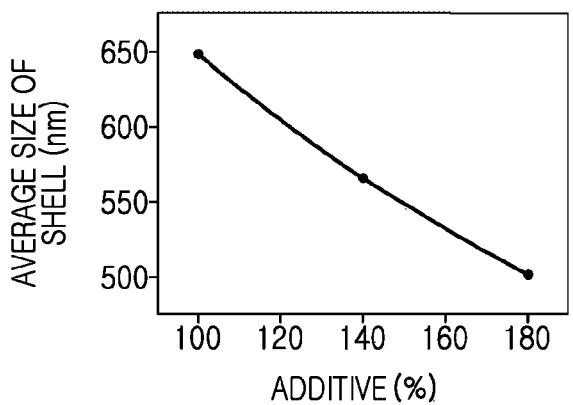
Figure 6C:
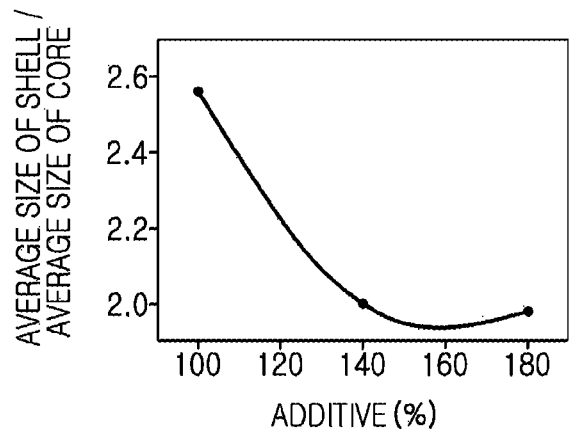
Figure 7A:
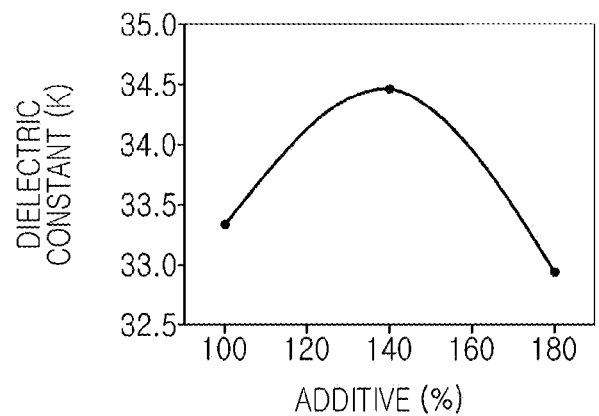
FIGS. 7A, 7B and 7C are graphs illustrating changes in a dielectric constant, capacitance, and quality factor depending on contents of additive.
Figure 7B:
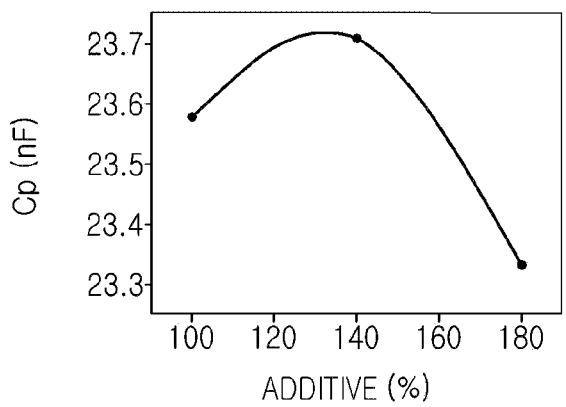
Figure 7C:
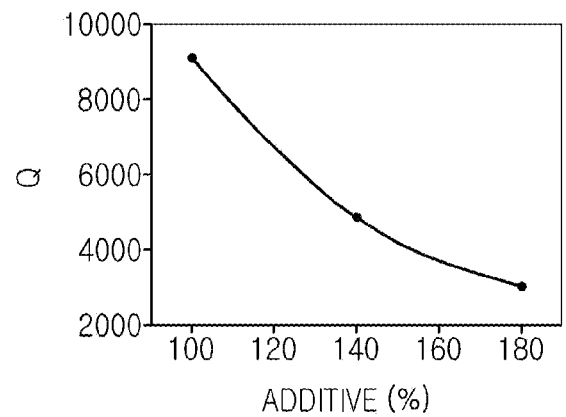

FIGS. 6A, 6B and 6C are graphs illustrating changes in average core-shell size depending on contents of additive according to some example embodiments of the present disclosure;

FIGS. 7A, 7B and 7C are graphs illustrating changes in a dielectric constant, capacitance, and quality factor depending on contents of additive.

Figure 8:
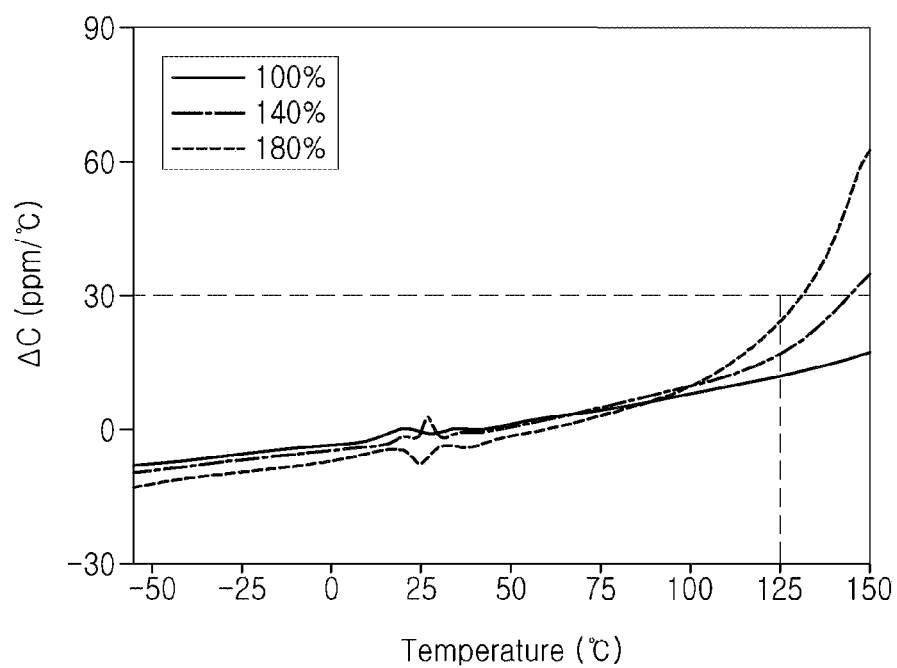
FIG. 8 is a graph illustrating changes in temperature-capacitance properties depending on contents of an additive.

FIG. 8 is a graph illustrating changes in temperature-capacitance properties depending on contents of additive.

Hereinafter, with reference to FIGS. 1 to 8, a multilayer electronic component according to some example embodiments and various example embodiments thereof will be described in detail.

The multilayer electronic component 100 in some example embodiments may include a body 110 including a dielectric layer and internal electrodes 121 and 122 disposed alternately with the dielectric layer 111 interposed therebetween; and external electrodes 131 and 132 disposed on the body, wherein the dielectric layer includes a main component including calcium (Ca), strontium (Sr), zirconium (Zr) and titanium (Ti) and a sub-component including manganese (Mn), yttrium (Y) and silicon (Si), wherein the dielectric layer includes a plurality of dielectric grains 20 and grain boundaries 30 disposed between adjacent dielectric grains, and at least a portion of the plurality of dielectric grains has a core-shell structure, and Ys/Yc>9 is satisfied in the core-shell structure, in which Yc is a content of yttrium (Y) included in a core based on 100 moles of zirconium (Zr) included in the core and a shell, and Ys is a content of yttrium (Y) included in the shell based on 100 moles of zirconium (Zr) included in the core and the shell. In some embodiments, an amount of each of Ca, Sr, Zr and Ti is larger than an amount of each of Mn, Y and Si in the dielectric layer.

The multilayer electronic component 100 according to some example embodiments may include a body 110 including the dielectric layer 111 and the internal electrodes 121 and 122 disposed alternately with the dielectric layer interposed therebetween; and the external electrodes 131 and 132 disposed on the body.

The shape of the body 110 may not be limited to any particular shape, but as illustrated, the body 110 may have a hexahedral shape or a shape similar to a hexahedral shape. Due to reduction of ceramic powder included in the body 110 during a firing process, the body 110 may not have an exact hexahedral shape formed by linear lines but may have a substantially hexahedral shape.

The body 110 may have first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction.

The plurality of dielectric layers 111 forming the body 110 may be in a fired state, and boundaries between adjacent dielectric layers 111 may be integrated with each other such that the boundaries may not be distinct without using a scanning electron microscope (SEM).

In some example embodiments, a raw material for forming the dielectric layer 111 is not limited to any particular example as long as sufficient capacitance may be obtained therewith. For example, a barium titanate-based material, a lead composite perovskite-based material, or a strontium titanate-based material may be used. The barium titanate material may include $BaTiO_3$ ceramic powder, and an example of the ceramic powder may include $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1) or $Ba(Ti_{1-y}Zr_y)O_3$ (0<y<1) in which Ca (calcium), Zr (zirconium) is partially solid-solute.

In some example embodiments and various example embodiments thereof, various examples for securing optimal quality factor (Q), capacitance, BDV properties, and capacitance-temperature properties when the dielectric layer 111 is formed using $CaZrO_3$-based materials will be described. That is, the dielectric layer 111 according to some example embodiments may include a main component including calcium (Ca), strontium (Sr), zirconium (Zr), and titanium (Ti).

The average thickness td of the dielectric layer 111 may not be limited to any particular example.

For miniaturization and high capacitance of the multilayer electronic component 100, the average thickness td of the dielectric layer 111 after firing may be 2.5 μm or less, and to improve reliability of the multilayer electronic component 100 under high temperature and high pressure, the average thickness td of the dielectric layer 111 after firing may be more than 3.0 μm.

The average thickness td of the dielectric layer 111 may refer to the average size of the dielectric layer 111 disposed between the first and second internal electrodes 121 and 122.

The average thickness td of the dielectric layer 111 may be measured by scanning a cross-section of the body 110 in the third and first directions (L-T cross-section) using a scanning electron microscope (SEM).

For example, the average thickness td of the dielectric layer 111 may be obtained by, with respect to a total of five dielectric layers, two upper layers and two lower layers based on the first layer of the dielectric layer at the point at which the central line in the length direction of the body and the central line in the thickness direction meet in a dielectric layer extracted from an image scanned with a scanning electron microscope (SEM) of a cross-section in the length and thickness direction (L-T) cut from the central portion of the body 110 in the width direction, determining five points at equal distances, two to the left and two to the right, centered on one reference point based on the point at which the central line in the length direction and the central line in the thickness direction of the body meet, and measuring an average value by measuring thicknesses of the points.

The internal electrodes 121 and 122 may be alternately disposed with the dielectric layer 111.

The internal electrodes 121 and 122 may include a first internal electrode 121 and a second internal electrode 122. The first and second internal electrodes 121 and 122 may be alternately disposed to oppose each other with the dielectric layer 111 included in the body 110 interposed therebetween, and may be connected to the third and fourth surfaces 3 and 4 of the body 110, respectively.

Referring to FIG. 2, the first internal electrode 121 may be spaced apart from the fourth surface 4 and may be exposed through the third surface 3, and the second internal electrode 122 may be spaced apart from the third surface 3 and may be exposed through the fourth surface 4.

In this case, the first and second internal electrodes 121 and 122 may be electrically spaced apart from each other by the dielectric layer 111 disposed therebetween.

Referring to FIG. 4, the body 110 may be formed by alternately stacking ceramic green sheets on which the first internal electrode 121 is printed and ceramic green sheets on which the second internal electrode 122 is printed, and firing the sheets.

The material for forming the internal electrodes 121 and 122 is not limited to any particular example, and a material having excellent electrical conductivity may be used. For example, the internal electrodes 121 and 122 may be formed by printing conductive paste for internal electrode including one or more of nickel (Ni), copper (Cu), palladium (Pd), silver (Ag), gold (Au), platinum (Pt), tin (Sn), tungsten (W), titanium (Ti), or alloys thereof on a ceramic green sheet.

A screen printing method or a gravure printing method may be used as a method of printing the conductive paste for internal electrodes, but an example embodiment thereof is not limited thereto.

The average thickness the of the internal electrodes 121 and 122 may not need to be limited to any particular example and may be varied. To miniaturize the multilayer electronic component 100, the average thickness the of the internal electrodes 121 and 122 may be 0.1 μm or more and 2.5 μm or less. To improve reliability of the multilayer electronic component 100 under high temperature and high pressure, the average thickness the of the internal electrodes 121 and 122 may be 0.1 μm or more and 2.5 μm or less, may be 0.1 μm or more and 2.5 μm or less, or 0.1 or more and 5.0 μm or less.

The average thickness the of the internal electrodes 121 and 122 may be obtained by, with respect to a total of five internal electrode layers, two upper layers and two lower layers based on the first layer of the internal electrode layer at the point at which the central line in the length direction of the body and the central line in the thickness direction meet in an internal electrode layer extracted from an image scanned with a scanning electron microscope (SEM) of a cross-section in the length and thickness direction (L-T) cut from the central portion of the body 110 in the width direction, determining five points at equal distances, two to the left and two to the right, centered on one reference point based on the point at which the central line in the length direction and the central line in the thickness direction of the body meet, and measuring an average value by measuring thicknesses of the points.

Referring to FIG. 2, the body 110 may include a capacitance forming portion Ac disposed in the body 110 and forming capacitance including the first internal electrode 121 and the second internal electrode 122 alternately disposed with the dielectric layer 111 interposed therebetween, and cover portions 112 and 113 formed on upper and lower portions of the capacitance forming portion Ac in the first direction.

The capacitance forming portion Ac may contribute to capacitance formation of a capacitor, and may be formed by repeatedly laminating a plurality of first and second internal electrodes 121 and 122 with a dielectric layer 111 interposed therebetween.

The upper cover portion 112 and the lower cover portion 113 may be formed by laminating a single dielectric layer or two or more dielectric layers on the upper and lower surfaces of the capacitance forming portion Ac in the thickness direction, respectively, and may prevent damages to the internal electrode due to physical or chemical stress.

The upper cover portion 112 and the lower cover portion 113 may not include internal electrodes and may include the same material as that of the dielectric layer 111.

The average thickness tc of the cover portion 112 and 113 may not be limited to any particular example. However, to easily obtain miniaturization and high capacitance of the multilayer electronic component, the average thickness tc of the cover portions 112 and 113 may be 15 μm or less.

The average thickness of the cover portion 112 and 113 may refer to the size in the first direction, and may be a value obtained by averaging the size of the cover portion 112 and 113 in the first direction measured at 5 points spaced apart by an equal distance in the upper or lower portions of the capacitance forming portion Ac.

In some example embodiments, margin portions 114 and 115 may be disposed on side surfaces of the capacitance forming portion Ac.

The margin portions 114 and 115 may include a margin portion 114 disposed on the fifth surface 5 and a margin portion 115 disposed on the sixth surface 6 of the body 110. That is, the margin portions 114 and 115 may be disposed on both side surfaces of the body 110 in the third direction.

As illustrated in FIG. 3, the margin portions 114 and 115 may refer to a region between both ends of the first and second internal electrodes 121 and 122 and the boundary surface of the body 110 in a cross-section of the body 110 taken in the width-thickness (W-T) direction.

The margin portions 114 and 115 may prevent damages to the internal electrode due to physical or chemical stress.

The margin portions 114 and 115 may be formed by forming internal electrodes by applying a conductive paste on the ceramic green sheet other than the region in which the margin portions are formed.

Also, to prevent a step difference due to the internal electrodes 121 and 122, after laminating, the internal electrodes may be cut out to be exposed to the fifth and sixth surfaces 5 and 6 of the body, a single dielectric layer or two or more dielectric layers may be laminated on both side surfaces of the capacitance forming portion Ac in the width direction, thereby forming the margin portions 114 and 115.

The width of the margin portion 114 and 115 may not be limited to any particular example. However, the average width of the margin portions 114 and 115 may be 15 μm or less to easily obtain miniaturization and high capacitance of the multilayer electronic component.

The average width of the margin portion 114 and 115 may refer to the average size of the margin portion 114 and 115 in the third direction, and may be a value obtained by averaging the size of the margin portion 114 and 115 in the third direction measured at 5 points spaced apart by an equal distance on the side of the capacitance forming portion Ac.

The external electrodes 131 and 132 may be disposed on the body 110.

The external electrodes 131 and 132 may be disposed on the body 110 and may be connected to internal electrodes 121 and 122.

As illustrated in FIG. 2, the first and second external electrodes 131 and 132 disposed on the third and fourth surfaces 3 and 4 of the body 110, respectively, and connected to the first and second internal electrodes 121 and 122, respectively, may be included.

In some example embodiments, the multilayer electronic component 100 may have two external electrodes 131 and 132, but the number and shape of the external electrodes 131 and 132 may be varied depending on the internal electrodes 121 and 122 or for other purposes.

The external electrodes 131 and 132 may be formed of any material having electrical conductivity, such as metal, and a specific material may be determined in consideration of electrical properties and structural stability, and the external electrodes 131 and 132 may have a multilayer structure.

For example, the external electrodes 131 and 132 may include electrode layers disposed on the body 110 and plating layers disposed on the electrode layers.

For a more specific example of the electrode layers, the electrode layers may be fired electrodes including a first conductive metal and glass, or a resin-based electrode including a conductive metal and resin.

Also, the electrode layers may have a form in which a fired electrode and a resin-based electrode are formed in order on the body. Also, the electrode layers may be formed by transferring a sheet including a conductive metal onto a body or by transferring a sheet including a conductive metal onto a fired electrode.

A material having excellent electrical conductivity may be used as the conductive metal included in the electrode layers. For example, the conductive metal may include one or more of nickel (Ni), copper (Cu), palladium (Pd), silver (Ag), gold (Au), platinum (Pt), tin (Sn), tungsten (W), titanium (Ti) and alloys thereof.

The type of the plating layer is not limited to any particular example, and a plating layer including at least one of nickel (Ni), tin (Sn), palladium (Pd) and alloys thereof may be provided, and may include a plurality of layers.

For a more specific example of the plating layers, the plating layers may be plating layers including Ni or plating layers including Sn, plating layers including Ni and plating layers including Sn may be formed in order on the electrode layers, and plating layers including Sn, plating layers including Ni, and plating layers including Sn may be formed in order. Also, the plating layers may include a plurality of Ni plating layers and/or a plurality of Sn plating layers In some example embodiments, in addition to the main component including a $CaZrO_3$-based material, one or more additives may be added to form the dielectric layer 111. In some embodiments, a material for forming the dielectric layer before firing may include 0.98 moles of $Mn_3O_2$, 1.225 moles of $Y_2O_3$, and/or 1.47 moles of $SiO_2$ as an additive based on 100 moles of $CaZrO_3$. However, the present disclosure is not limited thereto. The composition ratio of the additive may change after firing of the body 110 and the dielectric layer 111 may include a main component including calcium (Ca), strontium (Sr), zirconium (Zr) and titanium (Ti), and a sub-component including manganese (Mn), yttrium (Y), and silicon (Si).

Manganese (Mn) may suppress the movement of oxygen vacancies in the dielectric layer 111, and yttrium (Y) may act as a donor at the A-site of the $ABO_3$ structure and may reduce concentration of oxygen vacancies. Silicon (Si) may lower a sintering temperature of the dielectric layer 111 and promote sintering properties by reacting with one or more of the other elements included in the dielectric layer 111.

In some example embodiments, the dielectric layer 111 including a main component including calcium (Ca), strontium (Sr), zirconium (Zr) and titanium (Ti), may further include a sub-component including manganese (Mn), yttrium (Y), and silicon (Si), insulation resistance may be improved by suppressing the movement and concentration of oxygen vacancies in the dielectric layer 111, and accordingly, reliability of the multilayer electronic component 100 may be improved.

In some example embodiments, the content of manganese (Mn) included in the dielectric grains 20 may be 2.68 moles or more and 2.83 moles or less, based on 100 moles of zirconium (Zr) included in the dielectric grains.

Also, in some example embodiments, the content of manganese (Mn) included in the dielectric grains 20 may be 2.68 moles or more and 2.83 moles or less based on 100 moles of zirconium (Zr) included in the dielectric grains.

Also, in some example embodiments, the content of yttrium (Y) included in the dielectric grains 20 may be 2.26 moles or more and 3.33 moles or less based on 100 moles of zirconium (Zr) included in the dielectric grains.

By appropriately controlling the content of the sub-component included in the dielectric grains as above, the movement and concentration of oxygen vacancies in the dielectric layer 111 may be suppressed such that insulation resistance may improve, and by realizing high sintering density even at low firing temperatures, degradation of the quality factor (Q) and temperature coefficient of capacitance (TCC) of the multilayer electronic component 100 may be reduced and break down voltage (BDV) may improve.

However, the components included in the dielectric layer 111 may not be limited to the main component and the sub-component. The dielectric layer 111 may further include aluminum (Al), magnesium (Mg) and one or more of their oxides to improve sintering properties, and may further include one or more of hafnium (Hf), dysprosium (Dy), holmium (Ho), erbium (Er), terbium (Tb), vanadium (V) and their oxides to further improve reliability.

Capacitance properties, reliability and temperature-capacitance properties may vary depending on a microstructure of the dielectric layer 111 in example embodiments, and the microstructure of the dielectric layer 111 may vary depending on the concentration of the additive described above. However, changing the concentration of the additive may not be the only means of controlling the microstructure of the dielectric layer 111, which will be described later, and the microstructure of the dielectric layer 111 may be controlled through various means such as firing temperature and atmosphere. Hereafter, various microstructures of the dielectric layer 111 according to some example embodiments will be described in greater detail.

Referring to FIG. 5, in some example embodiments, the dielectric layer 111 may include grain boundaries 30 disposed between a plurality of dielectric grains 20 and grain boundaries 30 disposed between adjacent dielectric grains 20, at least a portion of the plurality of dielectric grains 20 may have a core 21-shell 22 structure.

The average content of sub-components including manganese (Mn), yttrium (Y), and silicon (Si) may be higher in the shell 22 than in the core 21.

The criteria for distinguishing the core 21 and the shell 22 may be described as below. When a line-profile is drawn along a linear line passing through the center point of dielectric grains 20, the content of a specific element may suddenly change at one point in dielectric grains 20. A region having a low content of the specific element may be defined as the core 21, and a region having a high content of the specific element may be defined as the shell 22.

In some example embodiments, the core 21 and the shell 22 may be defined with respect to the content of yttrium (Y). Specifically, the content of yttrium (Y) included in the core based on 100 moles of zirconium (Zr) included in the core and shell is defined as Yc, and the content of yttrium (Y)

included in the shell based on 100 moles of zirconium (Zr) included in the core and shell is defined as Ys, Ys, Ys/Yc>9 may be satisfied. Since yttrium (Y) may be substantially included only in the shell, the upper limit value of Ys/Yc is not limited to any particular example.

Depending on the proportion of the core 21 and the shell 22 in the dielectric grains 20, the capacitance and quality factor (Q) of the multilayer electronic component 100 may vary. In the experimental example described later, the ratio of the average size of the grains including the core 21 and the shell 22 to the average size of the core 21 which may secure appropriate dielectric constant, capacitance and quality factor (Q) may fall in the range of 2 or more and 2.57 or less. That is, in some example embodiments, by adjusting the ratio of the average size of the grains having the core 21 and the shell 22 to the average size of the core 21 from 2 to 2.57, the capacitance properties and quality factor (Q) of the multilayer electronic component 100 may be improved.

The average size of the core 21 may refer to the sum of the short axis and long axis of core 21 divided by 2, and the average size of the grains having the core 21 and the shell 22 may refer to the sum of the short axis and long axis of core 21 and shell 22 divided by 2. Also, the average size of the grains having the core 21 and the shell 22 may refer to the average size of dielectric grains 20, and may refer to the value obtained by adding the short axis and long axis of dielectric grains 20 divided by 2.

As an example of measuring the ratio of the average size of the core 21 and the shell 22 to the average size of the core 21, in the cross-section in the first and third directions polished to the center of the multilayer electronic component 100 in the second direction, the composition of a 2.68 μm×2.68 μm region of the dielectric layer 111 disposed in the central portion of the capacitance formation area may be analyzed through Transmission Electron Microscope-Energy Dispersive Spectroscopy (TEM-EDS), and the point at which the content of Y changes rapidly may be determined as the boundary between the core 21 and the shell 22, and the short axis and long axis of core 21 and the short axis and long axis of the grains including the core 21 and the shell 22 may be measured.

In some example embodiment, a secondary composition 40 may be disposed in at least a portion of grain boundaries 30. When the secondary composition 40 is disposed on at least a portion of the grain boundaries 30, insulation resistance of the dielectric layer 111 may be improved, and accordingly, break down voltage (BDV) of the multilayer electronic component 100 may be improved.

The types of elements included in the secondary composition 40 may vary depending on conditions such as the components of the dielectric layer 111 and firing temperature. In some example embodiments, the secondary composition 40 may include calcium (Ca), strontium (Sr), yttrium (Y) and/or silicon (Si), and accordingly, break down voltage (BDV) of the multilayer electronic component 100 may be improved.

Silicon (Si) may be substantially included only in the secondary composition 40, and silicon (Si) may not be substantially included in the grain boundaries 30 and the grains 20, other than the region in which the secondary composition 40 is formed. However, depending on the measurement method, the content of the silicon (Si) element in the grain boundaries 30 and the grains 20, other than the region in which secondary composition 40 is formed, may be measured at a noise level. For example, the content of silicon (Si) included in the region excluding the region in which the secondary composition is formed may be 0.05 at % or less based on the total content of the entirety of elements excluding oxygen (O) in the dielectric layers.

As the proportion of the secondary composition 40 in the dielectric layer 111 increases, the quality factor (Q) and temperature coefficient of capacitance (TCC) may decrease. Specifically, break down voltage (BDV) may be improved as the area fraction occupied by the secondary composition 40 in the dielectric layer 111 increases, but when the area fraction exceeds 3%, the quality factor (Q) and temperature coefficient of capacitance (TCC) may decrease. Accordingly, in some example embodiments, the area fraction occupied by the secondary composition 40 in the dielectric layer 111 may be 3% or less, and more preferably 2.57% or less.

The lower limit of the area fraction occupied by the secondary composition 40 among dielectric layer 111 may be not limited to any particular example, and to obtain the effect of improvement of sufficient break down voltage (BDV), the area fraction occupied by the secondary composition 40 in the dielectric layer 111 may be to 2.27% or more.

That is, in some example embodiments, the area fraction occupied by the secondary composition 40 in the dielectric layer 111 may be 2.27% or more and 2.57% or less, and accordingly, the decrease of the quality factor (Q) and temperature coefficient of capacitance of the multilayer electronic component 100 may be reduced and break down voltage (BDV) may improve.

In addition to the area fraction occupied by the secondary composition 40 in the dielectric layer 111, the average area of the secondary composition 40 may also cause changes in the quality factor (Q), temperature coefficient of capacitance (TCC) and break down voltage (BDV) properties of the multilayer electronic component 100. That is, in some example embodiments, the dielectric layer 111 may include a plurality of secondary compositions 40, and the average area of the plurality of secondary compositions 40 may be 0.104 μm² or more and 0.170 μm². Accordingly, degradation of the quality factor (Q) and temperature coefficient of capacitance (TCC) of the multilayer electronic component 100 may be reduced and break down voltage (BDV) may be improved.

As an example of measuring the area fraction occupied by the secondary composition 40 and the average area of the plurality of secondary compositions 40 in the dielectric layer 111 described above, in the first and third direction cross-section polished to the second direction central portion of the multilayer electronic component 100, the 10.82 μm×10.82 μm region of the dielectric layer disposed in the central portion of the capacitance formation area may be mapped for silicon (Si) element through TEM-EDS (Transmission Electron Microscope-Energy Dispersive Spectroscopy), and the area of each region may be calculated using an image analysis program (ImageJ). In this case, the area fraction occupied by secondary composition 40 in the dielectric layer 111 may be calculated as the ratio of the region in which secondary composition 40 is formed to the entire area of the measured image, and the average area of the plurality of secondary compositions 40 may refer to the average value calculated from the areas of five or more secondary compositions 40.

According to some example embodiments, in the multilayer electronic component 100 including the dielectric layer 111 comprising a main component containing calcium (Ca), strontium (Sr), zirconium (Zr) and titanium (Ti), a dielectric constant of dielectric layer 111 may be more influenced by sintering density than the average particle size of the dielectric grains. In other words, high sintering density may be implemented at low firing temperature without excessive adjustment of the average particle diameter of dielectric grains 20, and accordingly, a dielectric constant may be improved. Specifically, in some example embodiments, the average particle diameter of dielectric grains 20 may be 444 nm or more and 506 nm or less.

In the description below, the case of adding $Mn_3O_2$: 0.980 mole, $Y_2O_3$: 1.225 mole, and $SiO_2$: 1.470 moles based on 100 moles of $CaZrO_3$ may be defined as "additive 100%," and various experimental examples in which the amounts of additive were varied will be described in greater detail.

In the experimental examples described below, ceramic sheets were manufactured by mixing powder for forming a dielectric layer with different content of additives with a dispersant using ethanol and toluene as a solvent, and adding a binder therein. Ni electrodes were printed and laminated on the formed ceramic sheet, and the pressed and cut chips were calcined in an air atmosphere below 400° C. and fired for approximately 1 hour at approximately 1,300° C. under conditions of a hydrogen ($H_2$) concentration of 7.0% or less. Thereafter, by performing a termination process and electrode firing using copper (Cu) paste, the multilayer electronic component 100 may be completed.

EXPERIMENTAL EXAMPLE 1

Table 1 lists the results of measuring the content of elements included in the dielectric layer 111 in the multilayer electronic component 100 formed by varying the content of additive.

The content of each element corresponds to the relative value based on 100 moles of zirconium (Zr) included in the core and shell.

The element content in Table 1 was measured by analyzing the 2.68 μm×2.68 μm region of the dielectric layer disposed in the central portion of the capacitance forming portion through transmission electron microscope-energy dispersive spectroscopy (TEM-EDS) analysis at a magnification of 40,000 times using a 200 kV transmission electron microscope (TEM) in the cross-section in the first and third direction polished to the central portion of the multilayer electronic component 100 in the second direction.

was 2.83 moles based on 100 moles of zirconium (Zr) included in the dielectric grains.

Regarding the content of yttrium (Y), the content of yttrium (Y) included in the dielectric grains at additive 100% was 2.26 moles based on 100 moles of zirconium (Zr) included in the dielectric grains, and at additive 140%, the content of yttrium (Y) included in the dielectric grains was 3.33 moles based on 100 moles of zirconium (Zr) included in the dielectric grains.

EXPERIMENTAL EXAMPLE 2

Table 2 lists the results of measuring the microstructure of the dielectric layer 111 and evaluating the resulting properties in the multilayer electronic component 100 formed by varying the content of additive.

The average size of the core is defined as d1, and the average size of the core and shell (average size of dielectric grains) is defined as d2. In the cross-section in the first and third direction polished to the second direction center of the multilayer electronic component 100, by analyzing the composition of the 2.68 μm×2.68 μm region of the dielectric layer 111 disposed in the central portion of the capacitance forming portion through Transmission Electron Microscope-Energy Dispersive Spectroscopy (TEM-EDS) analysis, the point at which the content of Y changes rapidly was determined as the boundary between the core 21 and the shell 22, and the value obtained by adding the minor axis and major axis of the core 21 divided by 2 was determined as d1, and the value added by the minor axis and major axis of the dielectric grains 20 divided by 2 was determined as d2.

As for the room temperature capacitance and quality factor of the chip, the average value of the capacitance measured from a total of 20 samples was obtained under the conditions of 1 kHz and 1.0 V using an LCR meter. The dielectric constant may be a value calculated from the measured capacitance and dielectric thickness. As for BDV, 20 samples were measured at 25° C. and under voltage boost conditions of 400V/s, and the voltage value at the moment when the current value reached 10 mA was measured as the BDV value and the average value was obtained.

TABLE 1

| | Additive 100% | | | Additive 140% | | | Additive 180% | | | |
|---|---|---|---|---|---|---|---|---|---|---|
| | Core | Shell | Secondary composition | Core | Shell | Secondary composition | Core | Shell | Secondary composition | Unit |
| Ca | 65.36 | 64.88 | 39.55 | 64.67 | 65.27 | 45.74 | 63.01 | 64.61 | 42.62 | mol |
| Sr | 30.11 | 29.20 | 16.21 | 26.87 | 26.88 | 16.36 | 29.53 | 28.63 | 16.70 | mol |
| Zr | 100 | | 6.86 | 100 | | 4.74 | 100 | | 10.98 | mol |
| Ti | 3.04 | 4.10 | 0.95 | 2.65 | 5.75 | 0.64 | 3.21 | 5.96 | 0.86 | mol |
| Hf | 1.39 | 1.33 | 0.10 | 1.23 | 1.42 | 0.08 | 1.24 | 1.32 | 0.14 | mol |
| Mn | 0.75 | 1.93 | 3.87 | 0.52 | 2.31 | 0.60 | 0.88 | 2.69 | 1.88 | mol |
| Y | 0.04 | 2.22 | 1.33 | 0.00 | 3.33 | 1.41 | 0.40 | 3.82 | 0.17 | mol |
| Si | 0.00 | | 29.57 | 0.00 | | 28.63 | 0.00 | | 25.71 | mol |

Referring to Table 1, the secondary composition included calcium (Ca), strontium (Sr), yttrium (Y) and silicon (Si). In particular, it may be confirmed that silicon (Si) was substantially included only in the secondary composition 40.

Regarding the content of manganese (Mn), the content of manganese (Mn) included in dielectric grains at additive 100% was 2.68 moles based on 100 moles of zirconium (Zr) included in dielectric grains, and at additive 140%, the content of manganese (Mn) included in the dielectric grains

TABLE 2

| | Additive 100% | Additive 140% | Additive 180% |
|---|---|---|---|
| Average size of dielectric grains: d2 (nm) | 647 | 566 | 503 |
| Average size of core: d1 (nm) | 252 | 283 | 254 |

TABLE 2-continued

|  | Additive 100% | Additive 140% | Additive 180% |
|---|---|---|---|
| d2/d1 | 2.57 | 2.00 | 1.98 |
| Capacitance (nF) | 23.58 | 23.71 | 23.33 |
| Dielectric constant | 33.33 | 34.46 | 32.93 |
| Quality factor, Q | 9046 | 4822 | 3004 |
| BDV (V) | 444 | 506 | 573 |

Referring to Table 2 and FIG. 6, as the content of additive increased, the proportion of the shell in the dielectric grains tends to decrease, and the proportion of the core in the dielectric grains increased up to "additive 140%" and decreased.

Referring to Table 2 and FIG. 7, the quality factor tends to decrease as the additive content increased. In particular, the dielectric constant and capacitance tend to decrease when they exceeded "additive 140%."

Referring to Table 2, break down voltage (BDV) tends to improve as the content of additive increased.

According to the results of Table 1 and Table 2, the content of additive which may simultaneously improve the capacitance, dielectric constant, quality factor and BDV of the multilayer electronic component 100 may be in the range of "additive 100%" or more and "additive 140%" or less.

In this case, the range from "additive 100%" to "additive 140%" may be represented as the content of a specific element in the dielectric layer 111 after firing according to Table 1. For example, in some example embodiments, the content of manganese (Mn) included in the dielectric grains may be 2.68 moles or more and 2.83 moles or less based on 100 moles of zirconium (Zr) included in the dielectric grains, or the content of yttrium (Y) included in the dielectric grains may be 2.26 moles or more and 3.33 moles or less based on 100 moles of zirconium (Zr) included in the dielectric grains.

EXPERIMENTAL EXAMPLE 3

In Table 3, in the cross-section in the first and third direction polished to the central portion of the multilayer electronic component 100 in the second direction by varying the content of additive, the 10.82 μm×10.82 μm region of the dielectric layer disposed in the central portion of the capacitance forming portion was mapped for silicon (Si) element through Transmission Electron Microscope-Energy Dispersive Spectroscopy (TEM-EDS), and the area fraction occupied by the secondary composition 40 and the average area of multiple secondary composition 40 were measured using an image analysis program (ImageJ). Since the silicon (Si) element was practically disposed only in the secondary composition 40, the region in the dielectric layer 111 where the silicon (Si) element was disposed relatively intensively was regarded as the region in which the secondary composition 40 was formed.

In this case, the area fraction occupied by the secondary composition 40 in the dielectric layer 111 was calculated as the ratio of the region in which the secondary composition 40 was formed, based on the entire area of the measured image, and the average area of the plurality of the secondary compositions 40 was obtained as the average value calculated by arbitrarily calculating the areas of five or more secondary compositions 40.

TABLE 3

|  | Additive 100% | Additive 140% | Additive 180% |
|---|---|---|---|
| Secondary composition area fraction (%) | 2.57% | 2.27% | 2.28% |
| Secondary composition average area (μm$^2$) | 0.042 | 0.030 | 0.036 |
| Secondary composition maximum area (μm$^2$) | 0.170 | 0.104 | 0.102 |

Summarizing the results of Tables 2 and 3, in this case, the range of "additive 100%" or more and "additive 140%" or less may be represented as a parameter related to the area of secondary composition 40. Specifically, in some example embodiments, the area fraction occupied by the secondary composition in the dielectric layers may be 2.27% or more and 2.57% or less, or the average area of the plurality of secondary compositions may be 0.104 μm$^2$ or more and 0.170 μm$^2$ or less.

EXPERIMENTAL EXAMPLE 4

Referring to FIG. 8, as the content of additive increased, the temperature change (TCC) of capacitance increased, but in the "additive 100%" to "additive 180%" regions, COG properties of less than 30 ppm/° C. at −55-125° C. were satisfied.

However, the temperature change (TCC) properties of capacitance were more excellent in the "additive 100%" to "additive 140%" region.

There is no need to specifically limit the size of the multilayer electronic component 100.

To simultaneously obtain miniaturization and high capacitance, the multilayer electronic component 100 may have a size of 0201 (length×width, 0.2 mm 0.1 mm) or less, and products in which reliability in high temperature and high pressure environments is important may have a size larger than 3225 (length×width, 3.2 mm×2.5 mm), but an example embodiment thereof is not limited thereto.

Here, the length of the multilayer electronic component 100 may refer to the maximum size of the multilayer electronic component 100 in the second direction, and the width of the multilayer electronic component 100 may refer to the maximum size (W) of the multilayer electronic component in the third direction.

According to the aforementioned embodiments, in the multilayer electronic component including CSZT as a main component of the dielectric layer, by controlling the microstructure or composition of the dielectric layer, the dielectric properties of the multilayer electronic component may be improved.

Also, in the multilayer electronic component including CSZT as a main component of the dielectric layer, by controlling the microstructure or composition of the dielectric layer, reliability, such as withstand voltage properties and temperature-capacitance properties, of the multilayer electronic component may be improved.

While the example embodiments have been illustrated and described above, it will be configured as apparent to those skilled in the art that modifications and variations could be made without departing from the scope of the present disclosure as defined by the appended claims.

What is claimed is:

1. A multilayer electronic component, comprising:
a body including a dielectric layer and internal electrodes disposed alternately with the dielectric layer interposed therebetween; and
external electrodes disposed on the body,
wherein the dielectric layer includes:
a main component including calcium (Ca), strontium (Sr), zirconium (Zr) and titanium (Ti) and a sub-component including manganese (Mn), yttrium (Y) and silicon (Si); and
a plurality of dielectric grains and grain boundaries disposed between adjacent of the plurality of dielectric grains, wherein at least a portion of the plurality of dielectric grains has a core-shell structure that satisfies Ys/Yc>9,
wherein Yc is a content of yttrium (Y) included in a core of the core-shell structure based on 100 moles of zirconium (Zr) included in the core and a shell, and
Ys is a content of yttrium (Y) included in the shell based on 100 moles of zirconium (Zr) included in the core and the shell;
wherein the dielectric layer further includes a secondary composition in at least a portion of the grain boundaries, and
wherein an area fraction occupied by the secondary composition in the dielectric layer is 2.27% or more and 2.57% or less.

2. The multilayer electronic component of claim 1, wherein the dielectric layer includes a plurality of secondary compositions, and an average area of the plurality of secondary compositions is 0.104 μm² or more and 0.170 μm² or less.

3. The multilayer electronic component of claim 1, wherein the secondary composition includes calcium (Ca), strontium (Sr), yttrium (Y) and silicon (Si).

4. The multilayer electronic component of claim 1, wherein a content of silicon (Si) included in a region other a region in which the secondary composition is formed is less than 0.05 at % based on a total content of the entirety of elements excluding oxygen (O) in the dielectric layer.

5. The multilayer electronic component of claim 1, wherein a content of manganese (Mn) included in the dielectric grains is 2.68 moles or more and 2.83 moles or less based on 100 moles of zirconium (Zr) included in the dielectric grains.

6. The multilayer electronic component of claim 1, wherein a content of yttrium (Y) included in the dielectric grains is 2.26 moles or more and 3.33 moles or less based on 100 moles of zirconium (Zr) included in the dielectric grains.

7. The multilayer electronic component of claim 1, wherein a ratio of an average size of grains having the core and the shell to an average size of the core is 2 or more and 2.57 or less.

8. The multilayer electronic component of claim 1, wherein an average particle diameter of the dielectric grains is 444 nm or more and 506 nm or less.

9. The multilayer electronic component of claim 1, wherein the dielectric layer further includes aluminum (Al) and/or magnesium (Mg).

10. The multilayer electronic component of claim 1, wherein the dielectric layer further includes one or more of hafnium (Hf), dysprosium (Dy), holmium (Ho), erbium (Er), terbium (Tb) or vanadium (V).

* * * * *